Nov. 26, 1946.    P. ENDEBAK    2,411,509
SHAFT SEAL
Filed Aug. 4, 1944
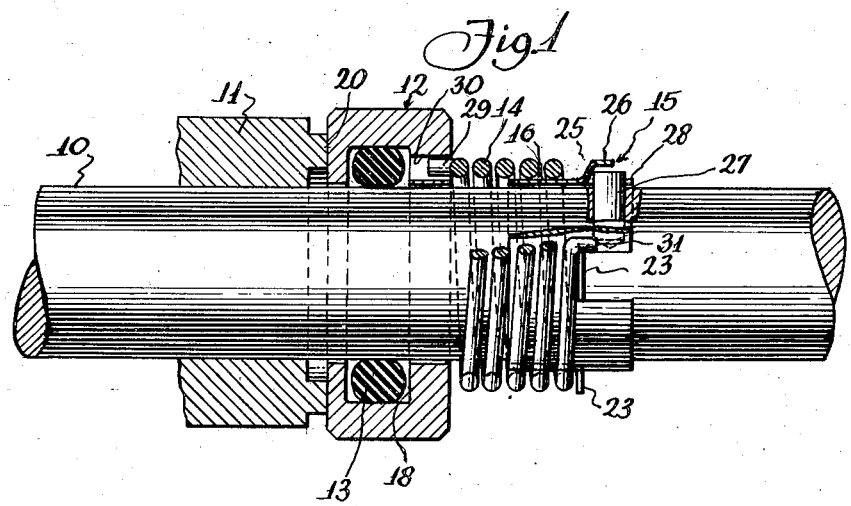
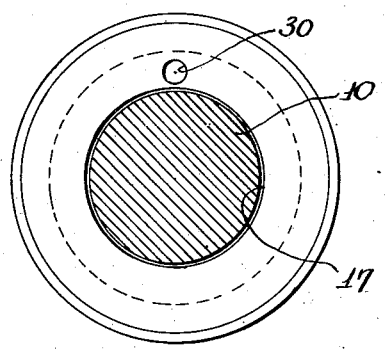
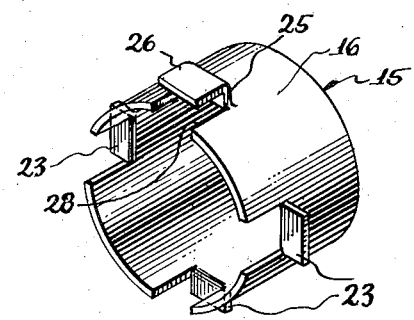
INVENTOR
Peter Endebak
Clarence F. Poole
ATTORNEY Patented Nov. 26, 1946

2,411,509

UNITED STATES PATENT OFFICE 2,411,509

SHAFT SEAL

Peter Endebak, Chicago, Ill., assignor to Tuthill Pump Company, Chicago, Ill., a corporation of Illinois Application August 4, 1944, Serial No. 548,067

5 Claims. (Cl. 286—7)

This invention relates to improvements in seals for shafts or the like, and has for its principal object to provide an efficient, durable device of the character described which is extremely simple and economical in manufacture and easily assembled or disassembled.

The invention may best be understood by reference to the accompanying drawing, in which:

Figure 1 shows the seal in longitudinal section, as applied to a shaft.

Figure 2 is a detail end view of the thrust collar forming part of the seal.

Figure 3 is a detail perspective view of the drive collar forming another part of the seal.

Referring now to details of the embodiment of my invention shown in the drawing, 10 indicates a rotatable shaft, which has bearing in a fixed bushing 11. The seal is designed to prevent leakage of fluid between the shaft and its bushing, and includes as its elements a thrust collar 12, packing ring 13, spring 14, drive collar 15 and drive pin 27.

The thrust collar 12 is cylindrical in shape, with a central bore 17 adapted to fit loosely on the shaft 10. The bore 17 is formed with a hollowed annular groove 18 intermediate its ends, within which is fitted an annular sealing member 13, preferably consisting of a ring of synthetic rubber, such as neoprene, which is normally substantially circular in cross section. The cross-sectional diameter of the ring however, is slightly greater than the radial depth of the hollowed groove 18 in the thrust collar, and the diameter of the hole in said ring is slightly less than the exterior diameter of the shaft, so that when the collar and its sealing ring is placed on the shaft the sealing ring will fit snugly on the shaft and will be maintained under compression between the shaft and the surrounding wall of groove 18.

The thrust collar 12 is driven with the shaft through the drive collar 15, and the coil spring 14 surrounding the shaft and urging the thrust collar into rotatable engagement with the proximate end of the bushing 11. In the form shown herein, said bushing has a projecting annular bearing surface 20 formed thereon for engagement with the thrust collar.

The drive collar 15 consists of an annular member, preferably formed of a single cylindrical piece of metal adapted to fit snugly on the shaft, and having a plurality of radially extending fingers 23, 23 (herein 3 in number) formed by bending partially severed longitudinally extending strips of the cylindrical piece outwardly near the outer end of the latter to provide an abutment for the outer end of the spring 14, which fits over the inner end of said collar, as shown in Figure 1.

An additional finger longer than the fingers 23, is also provided, consisting of an outwardly bent portion 25 and an elongated offset terminal portion 26, which is adapted to extend in parallel spaced relation to the shaft, to form a retaining means for the drive pin 27.

The pin 27 may be fitted loosely in an aperture formed in the shaft 10 with its outer end engaged in the slot 28 formed at the outer end of the collar 15 below the finger portions 25 and 26.

The inner end of the coil spring 14 has a projecting portion 29 adapted to be non-rotatably but detachably engaged with the thrust collar 12 as by insertion in a longitudinal hole 30 formed in the latter. The outer end of said spring has a similar projecting portion 31 which is adapted to be non-rotatably but detachably engaged with one of the fingers 23 on the drive collar 15.

The use and operation of the device above described will now be understood as follows:

The sealing ring 13 is initially inserted within the groove 18 of the thrust collar 12 so that these two parts may be handled as a single unit.

The seal parts are assembled by slipping the thrust collar 12, spring 14 and drive collar on the shaft in the order named, forcing the drive collar inwardly against the spring a sufficient distance to expose the pin aperture in the shaft, and permit the drive pin to be inserted in the latter. The pin is then registered within the slot 28 at the outer end of the drive collar, so that the parts will be maintained in the assembled relation shown in Figure 1, by the compression of the spring 14. Said spring serves to drive the thrust collar so that the said collar, sealing ring, spring and drive collar rotate with the shaft, while the thrust collar is maintained in fluid-tight engagement with the bearing surface 20 of the thrust bearing 11. The sealing ring 13 prevents leakage along the shaft through the thrust collar 12.

The parts are easily disassembled in a similar fashion by forcing the drive collar inwardly against the spring a sufficient distance to expose the drive pin and permit the latter to be removed from the shaft.

It will be especially noted that the hollowed groove 18 of the thrust collar 12 is made substantially wider in an axial direction than the normal width of the sealing ring 13 so as to permit expansion of the latter in a longitudinal direction when the sealing ring is maintained under compression between the shaft and the surrounding wall of said groove.

Although I have shown and described certain embodiments of my invention, it will be understood that I do not wish to be limited to the exact construction shown and described, but that various changes and modifications may be made without departing from the spirit and scope of the invention as defined in the appended claims.

I claim:

1. In a seal for a rotatable member, a relatively fixed bearing member, a thrust collar loosely mounted on said rotatable member in end-wise bearing engagement with said bearing member, a sealing member carried by said thrust collar in fluid-tight relation with said rotatable member, a second generally cylindrical collar slidably mounted on said rotatable member and provided with an integral radially off-set partially severed peripheral portion forming an outwardly opening slot, a coil spring affording endwise yieldable thrust connection between said second collar and said thrust collar, a drive pin detachably mounted in said rotatable member and normally maintained in the latter between said offset peripheral portion of said second collar by compression of said coil spring, but releasable from said peripheral portion and said rotatable member by sliding said second collar endwise against said spring.

2. In a seal for a rotatable member, a relatively fixed bearing member, a thrust collar loosely mounted on said rotatable member in endwise bearing engagement with said bearing member, a sealing member carried by said thrust collar in fluid-tight relation with said rotatable member, a drive collar slidably mounted on said rotatable member consisting of a generally cylindrical body formed with a plurality of outwardly bent partially severed portions in spaced relation adjacent its outer end to form abutments, a coil spring surrounding said rotatable member in engagement with said abutments and forming a yieldable drive connection between the latter and said thrust collar and means affording a detachable drive connection between said drive collar and said rotatable member.

3. In a seal for a rotatable member, a relatively fixed bearing member, a thrust collar loosely mounted on said rotatable member in endwise bearing engagement with said bearing member, a sealing member carried by said thrust collar in fluid-tight relation with said rotatable member, a drive collar slidably mounted on said rotatable member consisting of a generally cylindrical body formed with a plurality of outwardly bent partially severed portions in spaced relation adjacent its outer end to form abutments, a coil spring surrounding said rotatable member in engagement with said abutments and forming a yieldable drive connection between the latter and said thrust collar, said drive collar also having another partially severed portion disposed in outwardly offset parallel relation to said rotatable member to form an outwardly opening slot and a drive pin detachably mounted in said rotatable member and normally maintained in the latter beneath said offset parallel portion of said drive collar under compression of said spring, but releasable from said slot and rotatable member by sliding said drive collar against the compression of said spring.

4. In a seal for a rotatable member, a relatively fixed bearing member, a thrust collar loosely mounted on said rotatable member in endwise bearing engagement with said bearing member, a sealing member carried by said thrust collar in fluid-tight relation with said rotatable member, a second collar slidably mounted on said rotatable member consisting of a generally cylindrical body formed with a plurality of outwardly bent partially severed portions in spaced relation adjacent its outer end to form abutments, a coil spring surrounding said rotatable member in engagement with said abutments and forming a yieldable thrust connection between the latter and said thrust collar, and means affording a detachable drive connection between said second collar and said rotatable member.

5. In a seal for a rotatable member, a relatively fixed bearing member, a thrust collar loosely mounted on said rotatable member in endwise bearing engagement with said bearing member, a sealing member carried by said thrust collar in fluid-tight relation with said rotatable member, a second collar slidably mounted on said rotatable member consisting of a generally cylindrical body formed with a plurality of outwardly bent partially severed portions in spaced relation adjacent its outer end to form abutments, a coil spring surrounding said rotatable member in engagement with said abutments and forming a yieldable thrust connection between the latter and said thrust collar, said second collar also having another partially severed portion disposed in outwardly offset parallel relation to said rotatable member to form an outwardly opening slot and a drive pin detachably mounted in said rotatable member and normally maintained in the latter beneath said offset parallel portion of said second collar under compression of said spring, but releasable from said slot and rotatable member by sliding said second collar against the compression of said spring.

PETER ENDEBAK.